Jan. 3, 1956  J. V. KOSKI ET AL  2,729,308
MULTIPLE STAGE SHOCK ABSORBER
Filed Jan. 5, 1952  3 Sheets-Sheet 1

INVENTORS
JERRY V. KOSKI
BY ROBERT E. SCHWARY
Hudson, Boughton,
Williams, David & Hoffmann
ATTORNEYS Jan. 3, 1956    J. V. KOSKI ET AL    2,729,308
MULTIPLE STAGE SHOCK ABSORBER
Filed Jan. 5, 1952    3 Sheets-Sheet 2

INVENTORS
JERRY V. KOSKI
ROBERT E. SCHWARY
BY Hudson, Boughton,
Williams, David & Hoffman
ATTORNEYS Jan. 3, 1956 J. V. KOSKI ET AL 2,729,308
MULTIPLE STAGE SHOCK ABSORBER
Filed Jan. 5, 1952 3 Sheets-Sheet 3

INVENTORS
JERRY V. KOSKI
BY ROBERT E. SCHWARY
Hudson, Boughton,
Williams, David & Hoffmann
ATTORNEYS

United States Patent Office 2,729,308
Patented Jan. 3, 1956

2,729,308

MULTIPLE STAGE SHOCK ABSORBER

Jerry V. Koski, Cleveland, and Robert E. Schwary, Euclid, Ohio, assignors to The Gabriel Company, Cleveland, Ohio, a corporation of Ohio Application January 5, 1952, Serial No. 265,112

6 Claims. (Cl. 188—88)

This invention relates to improvements in hydraulic shock absorbers and particularly to direct double acting telescoping hydraulic shock absorbers.

An object of the invention is to improve the operating characteristics of direct double acting telescoping hydraulic shock absorbers during their compression or impact stroke.

Another object is to provide in direct double acting telescoping hydraulic shock absorbers improved, efficient and simple means providing better shock absorbing action during the impact or compression stroke and also enabling greater versatility to be obtained in the operating characteristics of the shock absorbers during the impact or compression stroke thereof.

The foregoing objects are accomplished by providing in a direct double acting telescoping hydraulic shock absorber two operatively interconnected auxiliary pressure build-up means which operate successively during the impact stroke, with one of said means cooperating with the piston of the shock absorber and the other of said means cooperating with the closure assembly for the pressure cylinder of the shock absorber and through which assembly the hydraulic medium flows during the impact stroke from the pressure cylinder to the reservoir. These auxiliary pressure build-up means may be arranged to function successively in either one of two orders that is, either one of the means may be arranged to function first to obtain certain different desired results.

In one arrangement the build-up in pressure resistance over the entire piston area is rapid while in the other arrangement the build-up in pressure resistance over the entire piston area is more gradual. In the first mentioned arrangement relatively high initial internal pressures in the working or pressure cylinder of the shock absorber due to piston rod displacement are avoided even though the pressure build-up over the entire piston area is rapid. In the second mentioned arrangement the pressure build-up over the entire piston area being more gradual the operation of the shock absorber is smoother and its operating characteristics more desirable for certain installations even though the initial internal pressure in the working cylinder due to piston rod displacement may be higher.

The invention may be utilized in direct double acting hydraulic shock absorbers which are employed in situations requiring improved, increased and versatile shock absorbing action during the impact or compression stroke of the piston.

Objects and advantages of the invention not hereinbefore referred to or specified will become apparent hereinafter during the detailed description of embodiments of the invention which is to follow.

In the accompanying drawings illustrating said embodiments of the invention and forming part of this specification—

Fig. 1 is a longitudinal sectional view through a direct double acting telescoping hydraulic shock absorber embodying one form of the invention, the shock absorber being broken away intermediate its ends to shorten said view, while the interconnected auxiliary pressure build-up means are shown in the floating positions they occupy at the start of the impact stroke of the piston.

Fig. 2 is a fragmentary longitudinal sectional view of the central portion of the shock absorber shown in Fig. 1 and is on a larger scale than Fig. 1, one of the auxiliary pressure build-up means being shown engaging the end of the piston while the other auxiliary pressure build-up means is not yet in engagement with its cooperating member, as occurs in this form of the invention during an intermediate portion of the impact stroke.

Figure 5:
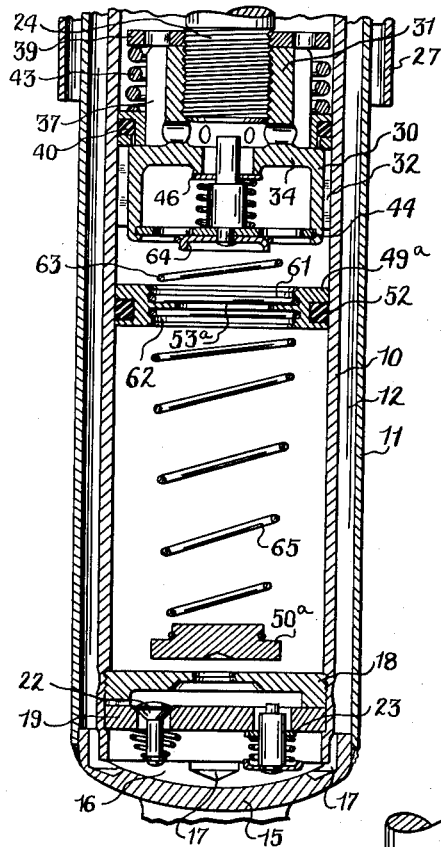

Fig. 5 is a fragmentary longitudinal sectional view through a direct double acting telescoping hydraulic shock absorber embodying a still different form of the invention and one wherein the two interconnected auxiliary pressure build-up means are connected to the piston, said auxiliary means being shown out of engagement with the parts with which they cooperate and in the position they occupy at the beginning of the impact stroke of the piston.

Figure 6:
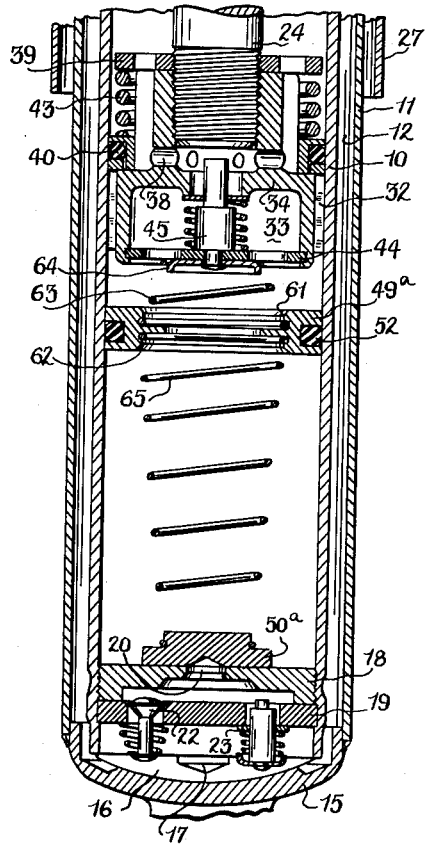

Fig. 6 is a view similar to Fig. 5 but illustrates the relationship of the parts at an intermediate stage of the impact stroke and at a time wherein the lowermost auxiliary pressure build-up means is in engagement with the closure assembly for the lower end of the working cylinder while the uppermost means is still out of contact with the piston.

Figure 7:
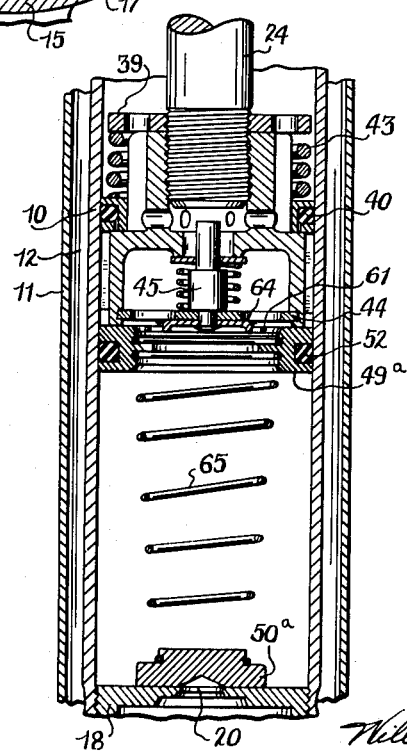

Fig. 7 is a view similar to Fig. 6 but illustrating the relationship of the parts at a still later stage of the impact stroke of the piston and one wherein the upper auxiliary pressure build-up means is contacting the piston while the first or lower pressure build-up means remains in contact with the closure assembly for the lower end of the working cylinder.

Figure 8:
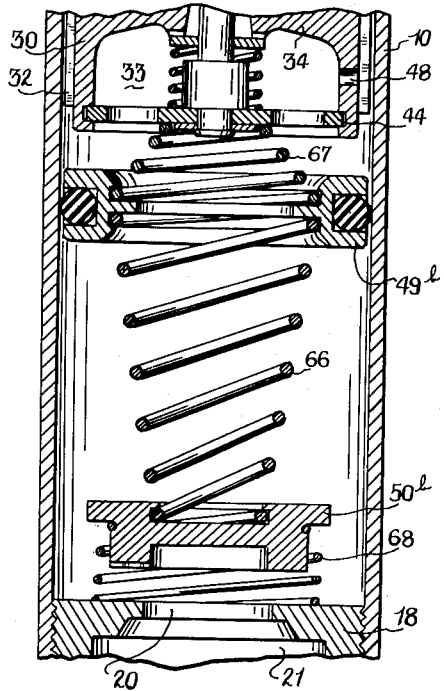

Fig. 8 is a fragmentary longitudinal sectional view through a direct double acting telescoping hydraulic shock absorber also embodying the invention and with the parts in the relationship they occupy at the start of the impact stroke; there being springs interposed between the two interconnected auxiliary pressure build-up means and the piston and closure assembly for the lower end of the working cylinder but said spring are not anchored or secured to said piston and said closure assembly.

Figure 9:
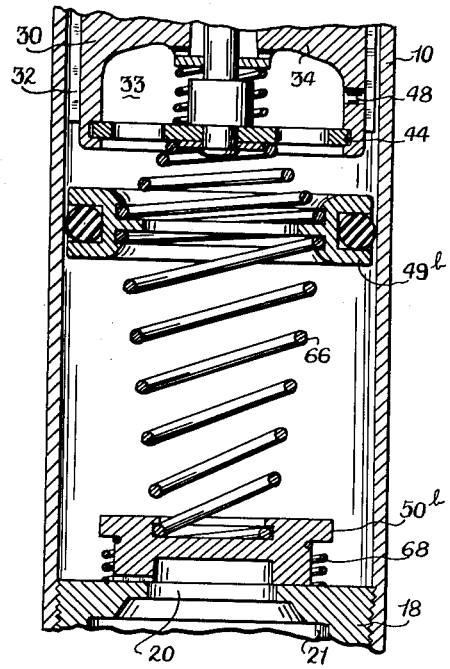
Figure 10:
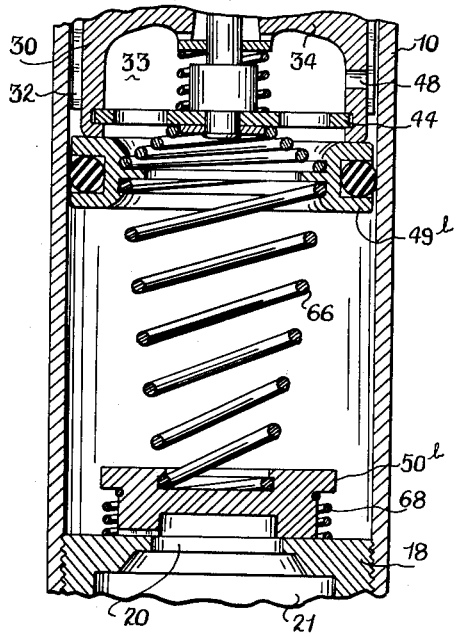

Fig. 9 is a view similar to Fig. 8 but illustrates the relationship of the parts at an intermediate point of the impact stroke of the piston; the lower of the auxiliary pressure build-up means now being in engagement with the closure assembly at the lower end of the working cylinder while the upper auxiliary pressure build-up means is still out of contact with the piston, and Fig. 10 is a view similar to Figs. 8 and 9 but illustrating the relationship of the parts at a still later point in the impact stroke of the piston than is shown in Fig. 9; the upper auxiliary pressure build-up means now being in contact with the lower end of the piston while the lower auxiliary means has remained in contact with the closure assembly at the lower end of the cylinder.

Figure 1:
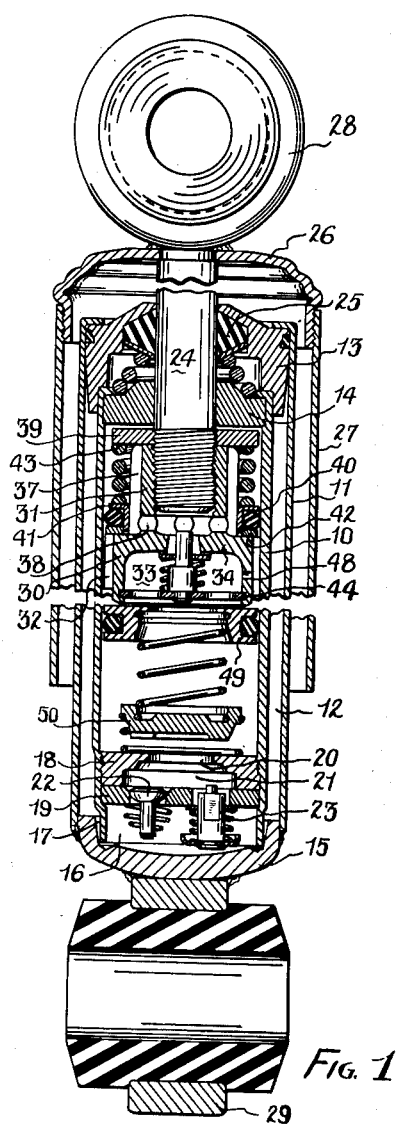

The direct double acting tubular telescoping hydraulic shock absorber illustrated in the drawings for descriptive purposes and in which the invention is embodied comprises a working or pressure cylinder 10 which is concentrically arranged within but spaced inwardly of a cylindrical casing 11. The annular space between the working cylinder 10 and the casing 11 constitutes a reservoir 12 for the hydraulic medium. The upper end of the casing 11, as viewed in Fig. 1, is closed by a head 13 which has portions bearing against the upper end of the working cylinder 10. The upper end of the working cylinder 10 is closed by a plug 14. The lower end of the casing 11 is closed by a lower cap member 15 and into which seats the lower end of the working cylinder 10.

A closure assembly is provided in the lower end of the working cylinder 10 above the lower cap member 15 to provide a space 16 intermediate the lower cap member and said closure assembly. The cap member 15 is provided internally with a plurality of circumferentially spaced grooves or passages 17 placing said space 16 in communication with the reservoir 12.

The closure assembly at the lower end of the working cylinder 10 is illustrated as including a plug element or stop cage 18 which may be threaded so as to screw into internal threads in the working cylinder 10 or said plug or cage may be mounted in the working cylinder in any other desired arrangement. Below the plug element 18 is a valve plate 19 held in position in the working cylinder and in engagement with the lower side of the plug element or cage 18 by means of an internal shoulder in the working cylinder. It will be understood that the closure assembly formed of the plug element or cage 18 and valve plate 19 can be mounted in position in any other desired way.

The plug element or stop cage 18 adjacent its upper end, as viewed in Fig. 1, is provided with a central opening 20 of substantial size and such that it offers no effective resistance to the flow of hydraulic medium therethrough. The plug element or cage 18 has enlarged counterbores 21 below and communicating with the opening 20 while the valve plate 19 is provided with two spaced openings communicating with the counterbores 21 and containing a replenishing valve 22 in one of the openings and a spring pressed impact or compression valve 23 in the other of the openings. The replenishing valve 22 and the impact or compression valve 23 may be of any desired construction but for purposes of illustration they are shown as corresponding to the replenishing valve and impact or compression valve illustrated and claimed in Patent 2,518,553, issued August 15, 1950, to William H. Kieber.

It will be understood by those skilled in the art that the hydraulic medium during the impact stroke of the piston will flow from that portion of the working cylinder 10 beneath the piston, through the opening 20 and counterbores 21 and, if sufficient pressure exists in the working cylinder to open the impact valve 23, then past said valve into the space 16, thence through the passages 17 and into the reservoir 12. It will also be understood that during the recoil or expansion stroke of the piston the hydraulic medium will flow from the reservoir into the space 16 and thence past the replenishing valve 22, through the counterbores 21 and opening 20 into the lower end of the working cylinder to maintain said cylinder full of the medium as the piston moves upwardly in the cylinder.

A piston rod 24 extends into the working cylinder and is slidable in a central opening in the closure plug 14 at the upper end of the working cylinder and in a sealing gasket 25 mounted in the closure head 13 for the upper end of the casing 11 as is well understood in the art. The piston rod 24 is illustrated as having a cap 26 secured thereto adjacent its outer end while a tubular shield 27 is secured to the cap 26 and said shield and cap telescope over the casing 11 during the reciprocation of the piston rod 24 in the operation of the shock absorber.

An upper attaching eye 28 is secured to the outer end of the piston rod 24 while a lower attaching eye 29 is secured to the lower end cap 15, said eyes enabling the shock absorber to be connected to two relatively movable parts such as the axle and frame of a motor vehicle as will be well understood in the art.

The inner end of the piston rod 24 is threaded and has screwed thereon a suitable piston which may take various forms but for purposes of illustration has been shown as similar to the piston illustrated and described in Patent No. 2,396,227, issued March 12, 1946, to Eugene L. Beecher. The piston as shown comprises a piston body consisting of a lower and larger portion 30 slidable in the working cylinder 10 and an upper and diametrically reduced portion 31. The periphery of the lower portion 30 is provided with a plurality of circularly spaced axially extending grooves or passages 32. The upper portion 31 being of less diameter than the internal diameter of the working cylinder 10 an annular space is provided between the cylinder and the periphery of the upper portion of the piston body. The lower portion 30 of the piston body is provided with a counterbore 33, the inner or upper end of which is separated from the reduced portion 31 by a wall 34, in the center of which is a bore 35 communicating with the counterbore 33 and with a central bore 36 in the upper portion 31 of the piston body.

The wall 34 surrounding the bore 35 is provided with an annular recoil valve seat boss projecting into the counterbore 33 and provided with radially extending bleed grooves or notches. The upper part 31 of the piston body is provided with the previously referred to central bore 36 which is threaded so that the threaded inner end of the piston rod 24 can be screwed into the bore 36 in uniting the piston body with the piston rod.

The upper reduced portion 31 of the piston body is provided on its periphery with a plurality of circularly spaced axially extending recesses or grooves 37 which extend from the lower part 30 of the piston to the upper end of the upper part 31. The piston part 31 adjacent to the lower part or portion 30 is provided with a plurality of circularly spaced ports 38 that place the lower end of the central bore 36 in communication with the recesses or grooves 37.

A spring abutment plate 39 is mounted on the piston rod 24 and engages the end of the upper part 31 of the piston body. A flexible packing and valve O-ring 40 of normally circular cross section and formed of any suitable material, such as synthetic rubber for example, is mounted on a carrier 41 which is slidable on the upper portion 31 of the piston body. The carrier 41 is in the form of a ring of angular cross-section and has an arm that extends longitudinally or axially of the piston and which contacts the upper piston portion 31 and slides therealong and a radially extending arm which overlies the upper side of the O-ring.

It will thus be seen that the O-ring 40 may move with the carrier 41 toward and away from the lower piston portion 30 upon changes in direction of piston movement and that when the O-ring is in the position shown in Fig. 1 it acts as a valve to close the grooves or passages 32 and place the same out of communication with the grooves or passages 37.

A rigid ring or washer 42 is interposed between the flexible O-ring 40 and the upper end of the lower portion 30 of the piston body to prevent the flexible O-ring extruding into the grooves or passages 32. A coil spring 43 is mounted on the piston portion 31 and abuts the plate 39 and the carrier 41 and exerts pressure on the carrier to maintain the flexible O-ring or gasket 40 in the position shown in Fig. 1, at which time the passages 32 are closed.

A disk 44 is secured in the lower portion 30 of the piston body within the counterbore 33 and said disk is provided with a plurality of openings and has rigidly and centrally secured to it a stud 45 which projects into the bore 35 and slidably mounts a flat disk recoil valve 46 that is held normally against the valve seat boss of the wall 34 by a coil spring 47 mounted on the stud 45.

The construction of the shock absorber illustrated in Fig. 1 and heretofore described per se forms no part of the present invention but is shown simply as environment for the auxiliary pressure build-up means constituting the invention and soon to be described. It will be understood that the piston construction may vary substantially from that illustrated and described herein so long as it contains passages for the flow of hydraulic medium past the piston during the impact stroke.

The lower piston portion 30 is shown as provided with a bleed orifice 48 communicating with the counterbore 33 and with one of the peripheral grooves 32 and the purpose of this bleed orifice will later be pointed out.

Figure 2:
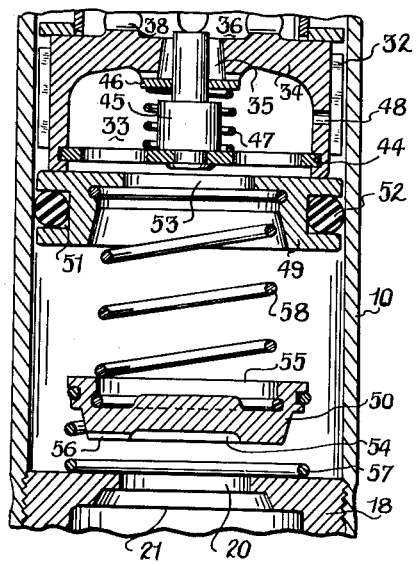
Figure 3:
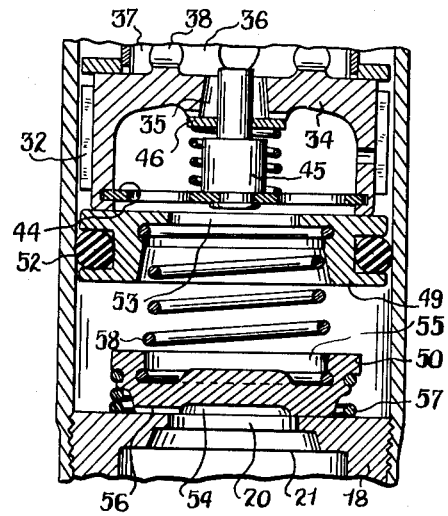
Fig. 3 is a view similar to Fig. 2 and illustrates the other auxiliary pressure build-up means in engagement with the closure assembly for the working cylinder at the lower end thereof with said first means still in engagement with the piston and which engagement of said other means occurs after the first auxiliary means has engaged the piston as referred to in connection with Fig. 2.

The shock absorber shown in Figs. 1 to 3 inclusive is provided with two interconnected but floating auxiliary pressure build-up means, one of which is indicated generally at 49 and the other at 50. The auxiliary means 49 comprises a circular member of a diameter slightly less than the internal diameter of the working cylinder 10 and provided on its circumference with a circular groove 51 into which fits an O-ring packing 52 that contacts the interior of the working cylinder 10 and seals against the flow of hydraulic medium between the circumference of the member forming the auxiliary means 49 and the interior of the working cylinder. It will be understood that the O-ring packing 52 is shown simply by way of illustration and that other forms of packing or sealing means might be mounted in the groove 51 or that the auxiliary means 49 might be used without any packing and simply have a sliding fit in the cylinder.

The member forming the auxiliary means 49 is provided on its upper side as viewed in the drawings with a relatively large central opening or bore 53 through which hydraulic medium may freely flow and communicating with enlarged counterbores formed in the member below the opening or bore 53. The auxiliary means 50 may be designated as a button member and is provided on its underside with a central recess 54 and on its upper side with a larger central circular recess 55. This button member at its lower end is of substantially greater diameter than the opening 20 in the plug or stop cage 18, wherefore when the button member engages the plug 18 it will overlie and close the opening 20.

The lower end of the button member is provided with a calibrated radially extending bleed groove or passage 56 extending from the circumference of the button member to the recess 54 for a purpose later to be explained. A coil spring 57 surrounds the circumference of the button member and has one end anchored to said member externally thereof as, for example, one convolution of the spring may be anchored in a circumferential groove formed in the button member. The opposite end of the spring 47 is adapted to abut against the upper side of the plug 18, wherefore said spring 57 normally maintains the button member spaced from the plug 18 as indicated in Fig. 1 and 2.

A coil spring 58 directly and mechanically interconnects the two auxiliary pressure build-up means 49 and 50, one end of said spring being anchored in the smaller of the counterbores in the member forming the auxiliary means 49 while the other end of the spring 58 is anchored in the recess 55 of the auxiliary means 50.

From the foregoing it will be seen that the auxiliary pressure build-up means 49 and 50 while mechanically interconnected by the spring 58 float in the working cylinder 10 since the means 49 is not connected to the piston while the means 50 is not connected to the plug 18, it being recalled that the spring 57 merely bears against but is not anchored to said plug 18.

In the embodiment of the invention shown in Figs. 1 to 3 inclusive the auxiliary pressure build-up means 49 may be termed a secondary hydraulic stop while the auxiliary means 50 may be designated as a primary hydraulic stop.

It will be assumed that the shock absorber is mounted on a motor vehicle and that the working cylinder 10 is filled with hydraulic medium and also the reservoir 12 is partially filled therewith. When the wheels of the vehicle strike an obstruction so that the axle and the frame move relatively toward each other to compress the vehicle springs an impact, compression or downward relative movement of the piston occurs in the working cylinder as will be well understood. This relative movement of the piston builds up pressure in the working cylinder below the piston and when such pressure overcome the action of the spring 43 the flexible O-ring 40 and carrier 41 move upwardly so as to open the peripheral passages 32 of the piston and permit the hydraulic medium to flow from the lower side of the piston to the upper side thereof. Also the pressure will open the impact valve 23 and the medium displaced by the piston rod may flow from the working cylinder 10 to the reservoir 12. The impact or compression movement of the piston continuing, the auxiliary pressure means 49 is picked up by the lower end of the piston body as indicated in Fig. 2, whereupon said auxiliary means 49 closes off the flow of the hydraulic medium through the peripheral passages 32 of the piston body. The shutting off of the flow of the hydraulic medium from the underside of the piston to the upper side thereof, except such as flows through the bleed orifice 48, causes a pressure build-up against the entire piston area, thus avoiding excessive pressure build-up against the piston rod area alone. This pressure build-up against the entire area of the piston may be termed a secondary compression pressure and the auxiliary means 49, as already stated, can be designated as a secondary hydraulic compression stop. The further impact movement of the piston after the relationship shown in Fig. 2 has obtained, moves with it the auxiliary stop means 49 and also the auxiliary stop means 50 due to the mechanical interconnection between said auxiliary means effected by the spring 58. This eventuates into compressing the spring 57 and seating the auxiliary stop means 50 against the plug or stop cage 18 as indicated in Fig. 3. When this occurs the flow of hydraulic medium from the working cylinder through the opening 20 and the impact valve to the reservoir is restricted and a high pressure is built up in the space between the auxiliary means 49 and 50 which is applied against the entire piston area and which offers a very substantial resistance to any further movement of the piston in the direction of the impact stroke.

The previously referred to calibrated groove or passage 56 in the auxiliary means 50 provides for a predetermined flow of hydraulic medium from the working cylinder such that the high pressure build-up in the space between the auxiliary means 49 and 50 provides the desired resistance to piston movement without providing a complete hydraulic lock against piston movement.

Also it has been previously mentioned that the piston body is provided with an orifice 48 and said orifice is calibrated so as to permit a predetermined flow of the hydraulic medium past the piston to the upper side thereof to assure the upper side of the piston receiving the requisite quantity of the hydraulic medium to maintain it completely filled.

From the foregoing it will have been seen that the operating characteristics of the shock absorber during the impact or compression stroke will include a rapid build-up of pressure acting against the entire piston area after an initial impact movement of the piston. Inasmuch as the auxiliary means 50 seats against the plug 18 after the auxiliary means 49 has been picked up by the piston, extremely high internal pressures in the working cylinder due to piston rod displacement are avoided prior to means 50 engaging stop cage 18.

In the shock absorber shown and described with respect to Figs. 1 to 3 inclusive, the auxiliary pressure build-up means 49 and 50 while mechanically interconnected by the spring 58 are not anchored in the working cylinder 10 but freely float therein. In this arrangement the possibility exists of the auxiliary pressure build-up means as an assembly working upwardly in the cylinder 10 to a position wherein the means 49 would close off the flow of the hydraulic medium from the underside of the piston to the upper side thereof earlier in the impact stroke than is desired and this might cause an excessive amount of the hydraulic medium to be forced out of the working cylinder during the early part of the impact stroke.

Figure 4:
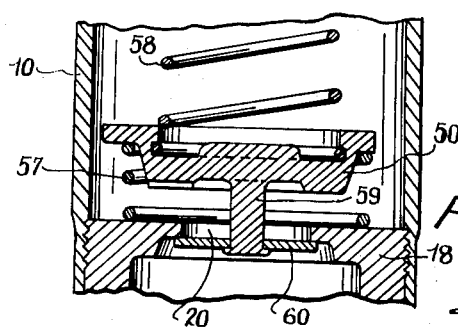
Fig. 4 is a fragmentary sectional view of a construction similar to that shown in Figs. 1 to 3 inclusive but illustrating a slight modification to provide a positive restraint of floating movement in one direction of the two auxiliary pressure build-up means in the working cylinder.

In Fig. 4 the auxiliary pressure build-up means 50 is positively limited in its movement upwardly in the working cylinder and away from the closure means including the plug or stop cage 18 and since the auxiliary means 50 is connected by the spring 58 to the auxiliary means 49 the latter also is limited to a predetermined upward movement in the working cylinder. Consequently the danger of the auxiliary stop means 49 and 50 wandering as a unit to an undesirable upper position in the working cylinder is avoided.

In Fig. 4 the auxiliary stop means 50 is provided on its lower side and centrally thereof with a downwardly extending pin 59 which extends through the opening 20 in the plug element or stop cage 18 and carries on its lower end a narrow stop bar 60 of such length as to engage the base of the smaller of the counterbores 21 in the plug element 18. Hence when the stop bar 60 engages the base of the smaller of the counterbores 21 as is illustrated in Fig. 4, further movement of the auxiliary pressure build-up means 50 away from the plug is positively limited and this limitation against upward movement applies to the auxiliary stop means 49 since the two stop means are interconnected by the spring 58 and therefore the maximum upward position of the means 49 can be predetermined such that it will not engage the piston too early in the impact stroke of the piston.

It has been pointed out that in the construction shown in Figs. 1 to 4 inclusive the pressure build-up over the entire area of the piston is relatively rapid, due to the passage for the hydraulic medium through the piston becoming closed early in the impact stroke. In some installations the rapid build-up of pressure over the entire piston area might be disadvantageous and result in undesired riding characteristics. Accordingly a form of the invention is illustrated in Figs. 5 to 7 inclusive wherein the pressure build-up over the entire piston area is more gradual than in the first described forms.

In the form of construction shown in Figs. 5 to 7 inclusive both of the auxiliary pressure build-up means are mechanically connected to the piston and will move therewith during part of the impact stroke and since the lowermost auxiliary pressure build-up means is mechanically connected to the uppermost one said lowermost means will engage the plug element or stop cage at the lower end of the working cylinder before the upper means engages the piston. This arrangement, therefore, first closes off the opening in the stop cage and substantially terminates the flow of the hydraulic medium from the working cylinder to the reservoir. This creates a pressure build-up due to piston rod displacement. Subsequently the upper auxiliary pressure build-up means engages the piston and closes off the flow of hydraulic medium through the passages 32 from the underside of the piston to the upper side thereof. This results in the pressure area being enlarged to include the entire piston area.

The sequence in which the two auxiliary pressure build-up means function in the form shown in Figs. 5 to 7 inclusive results in the hydraulic resistance in the working cylinder being built up more gradually than in the first described forms.

The general shock absorber construction shown in Figs. 5 to 7 inclusive is identical with that shown in the previous views and hence the same reference characters are used in Figs. 5 to 7 inclusive to indicate the identical parts of the previously described views and the description of these identical parts for brevity will not be repeated.

In Figs. 5 to 7 inclusive the upper auxiliary pressure build-up means is indicated at 49a and said means 49a is similar to the previously described means 49 in that it is provided with a circumferential groove mounting a flexible O-ring 52. The means 49a intermediate its lower and upper sides is provided with a central opening 53a which communicates on its upper side with a counterbore 61 and on its lower side with a counterbore 62. A coil spring 63 has one end anchored in the counterbore 61 of the auxiliary means 49a and its opposite end connected to the piston by means of a securing plate 64 secured to the disk 44 by a headed portion of the stud 45. Consequently the auxiliary pressure build-up means 49a is mechanically connected to the piston of the shock absorber through the spring 63, and will move with the piston as the latter reciprocates in the working cylinder during its impact and recoil strokes.

The lower auxiliary pressure build-up means 50a is similar in construction to the previously described means 50 and although it is not shown as provided with a bleed orifice such as the orifice 56 in the previously described form, it will be understood that it may be so provided. The auxiliary means 50a instead of having a counterbore on its upper side is provided with a centrally located raised portion which constitutes an anchorage for one end of a coil spring 65, the other end of which spring is anchored to the upper auxiliary means 49a in the counterbore 62. Hence the auxiliary means 49a and 50a are mechanically interconnected by the spring 65 similar to the mechanical interconnection between the means 49 and 50 afforded by the spring 58 in the previously described forms. Consequently until the lower auxiliary means 50a engages the stop cage 18 it will move with the upper auxiliary means 49a and with the piston.

In the form shown in Figs. 5 to 7 inclusive no spring is interposed between the lower auxiliary means 50a and the stop cage 18 as is the case in the previously described forms wherein there is utilized a spring 57 in such location.

Fig. 5 represents the relationship of the parts at the start of the impact or downward stroke of the piston. When the piston has moved a short distance downward in its impact stroke the lower auxiliary pressure build-up means 50a engages the stop cage 18 as indicated in Fig. 6. Thereupon the flow of hydraulic medium from the working cylinder to the reservoir through the impact valve 23 terminates except possibly for a bleed flow if the means 50a is equipped with a bleed passage or orifice. When this condition prevails a pressure build-up occurs in the working cylinder 10 due to piston rod displacement of the hydraulic medium but this pressure build-up is not yet applied over the entire piston area since the upper auxiliary means 49a has not yet engaged the lower end of the piston to close off the peripheral passages 32. However, a further downward movement of the piston in its impact stroke causes a compression of the spring 65 interconnecting the two auxiliary pressure build-up means until the load of said spring overcomes the load of the spring 63 and allows the latter to be compressed and the upper auxiliary means 49a to be picked up by the lower end of the piston as indicated in Fig. 7. At this time the upper auxiliary means 49a closes off the passages 32 to prevent the flow of the hydraulic medium from the underside of the piston to the upper side thereof except for possibly a bleed flow. Consequently the continued impact movement of the piston results in a pressure build-up acting against the entire piston area.

It will be understood that in the operation of the shock absorber shown in Figs. 5 to 7 inclusive the O-ring 40 carried by the piston will have moved to a position wherein the passages 32 are open when sufficient pressure has developed in the cylinder 10 to overcome the load of the spring 43, although in the three views, Figs 5 to 7 inclusive, said ring is shown in the closed position.

The general features of the shock absorber construction shown in Figs. 8 to 10 inclusive are identical with the general features of the shock absorber constructions illustrated in the previous views and consequently the shock absorber features and parts which are thus identical are indicated by the same reference characters and need not be further described herein.

The upper auxiliary pressure build-up means 49b is substantially identical with the upper pressure build-up means 49a of Figs. 5 to 7 inclusive. The lower auxiliary pressure build-up means 50b is substantially identical with the lower auxiliary pressure build-up means 50 of Figs. 1 to 3 inclusive. The auxiliary pressure build-up means 49b and 50b are mechanically interconnected by a coil spring 66 which has one end anchored to the means 49b and its other end anchored to the means 50b as in the previously described forms.

The auxiliary pressure build-up means 49b and 50b are not positively connected to the piston of the shock absorber although a coil spring 67 is interposed between the auxiliary pressure buildup means 49b and the adjacent side of the piston somewhat similar to the coil spring 63 of Fig. 5, except that the coil spring 67 is anchored only to the means 49b and merely abuts the adjacent side of the piston when the latter has moved partway in its impact stroke.

A coil spring 68 is interposed between the auxiliary pressure build-up means 50b and the closure means 18, said spring 68 being anchored to the means 50b but merely abutting the closure means 18 and thus being similar in construction and mounting to the coil spring 57 of Figs. 1 to 3 inclusive.

The interposed coil spring 67 is illustrated in Figs. 8 to 10 as stronger than the coil spring 68 and hence the auxiliary pressure build-up means 49b and 50b function in the sequential order of the auxiliary pressure build-up means 49a and 50a of Figs. 5 to 7, in that the upper auxiliary pressure build-up means 49b does not engage or contact the adjacent side of the piston during the impact stroke until after the lower pressure build-up means 50b has engaged the closure means 18. Consequently the arrangement illustrated in Figs. 8 to 10 inclusive may be said to function substantially in the same way as does the arrangement shown in Figs. 5 to 7 except that the auxiliary pressure build-up means 49b is not positively and mechanically connected to the piston as the spring 67 merely abuts the piston after the latter has moved part way in its impact stroke.

It will be understood that if the interposed spring 67 is weaker than the interposed spring 68 then the auxiliary pressure build-up means 49b would engage the adjacent side of the piston during the impact stroke prior to the auxiliary pressure build-up means 50b engaging the closure means 18 and when such an arrangement is employed the auxiliary pressure build-up means 49b and 50b would function similarly to the auxiliary pressure build-up means 49 and 50 of Figs. 1 to 3 inclusive.

Although several embodiments of the invention have been illustrated and described herein it will be understood that the invention is susceptible of various modifications and adaptations within the scope of the appended claims.

Having thus described our invention, we claim:

1. In a direct double acting hydraulic shock absorber having a working cylinder, a reservoir, a piston member reciprocable in said cylinder, a closure member at one end of the cylinder provided with a communicating passage between the cylinder and reservoir for the flow of hydraulic medium from the cylinder to the reservoir during the impact of the piston member toward said closure member, and flow passage means on said piston member for the flow of hydraulic medium during the impact stroke of the piston member from the side thereof adjacent to said closure member to the other side of the piston member; the improvement which comprises a pair of successively acting auxiliary pressure build-up means in and spaced longitudinally of said cylinder and located intermediate said members with one of said means adjacent to said piston member and the other of said means adjacent to said closure member, said pressure build-up means each being spaced from its adjacent member in the normal load position of the shock absorber, and a coil spring anchored at its opposite ends to said pressure build-up means and forming a direct mechanical interconnection therebetween for effecting movement of said pressure build-up means in unison and also providing for relative movement therebetween, one of said pressure build-up means acting during the impact stroke of the piston member to engage the adjacent side of the piston member to close said piston flow passage means and the other acting during the impact stroke to engage said closure member and close the communicating passage therein.

2. The improvement defined in claim 1 and wherein a coil spring is interposed between the pressure build-up means which is adjacent to said closure member and the latter.

3. The improvement defined in claim 1 and wherein a coil spring is interposed between the pressure build-up means which is adjacent to the piston member and the latter.

4. The improvement defined in claim 1 and wherein coil springs are interposed between said pressure build-up means and said piston member and said closure member.

5. The improvement defined in claim 1 and wherein coil springs are interposed between said pressure build-up means and said piston member and said closure member, with one of said last mentioned coil springs being of greater strength than the other thereof.

6. The improvement defined in claim 1 and wherein a coil spring is interposed between the pressure build-up means which is adjacent to the closure member and the latter, said pressure build-up means and said closure member having cooperating elements positively limiting movement of said pressure build-up means away from said closure member under the action of the coil spring interposed therebetween.

References Cited in the file of this patent

UNITED STATES PATENTS

| | | |
|---|---|---|
| 2,379,750 | Rossman | July 3, 1945 |
| 2,395,027 | Whisler | Feb. 19, 1946 |
| 2,507,267 | Patriquin | May 9, 1950 |
| 2,599,477 | Patriquin | June 3, 1952 |
| 2,619,199 | Schwarz | Nov. 25, 1952 |